3,440,058
ACTIVE DRY YEAST
Seymour Pomper, Stamford, Conn., and Emanuel Akerman, Bronx, N.Y., assignors to Standard Brands Incorporated, New York, N.Y., a corporation of Delaware
No Drawing. Filed Sept. 28, 1965, Ser. No. 491,026
Int. Cl. C12c *11/18;* A23j *1/18*
U.S. Cl. 99—96                                  16 Claims

ABSTRACT OF THE DISCLOSURE

An active dry yeast having a moisture content below about 7.5 percent by weight and a glyceryl diester wherein one of the ester groups is derived from a saturated fatty acid having a carbon chain length greater than 12 and the other ester group contains at least one available acid group. The ester imparts superior leavening activity to the yeast.

---

This invention relates to a novel active dry yeast product and a process for preparing the same.

Commercial active dry yeast, sold today, is a yeast product which has been dehydrated under controlled conditions to a moisture content of about 8 percent by weight. The keeping qualities and cool water tolerance of yeast are dependent upon its moisture content. At high moisture levels, yeast will have poor keeping qualities while at low moisture levels it will have good keeping qualities. However, in the case of the cool water tolerance of yeast just the opposite is true; that is, at high moisture levels the cool water tolerance will be good while at low moisture levels it will be poor. Cool water tolerance is a measure of a yeast's leavening activity after it has been rehydrated in cool water; for instance in water at 70° F. Also, during the drying procedure, an appreciable part of the yeast's leavening activity is destroyed. Thus the 8 percent moisture level has been selected so that the active dry yeast has relatively good keeping qualities, its leavening activity has not been damaged to too great an extent and it has fair cool water tolerance.

It is the principal object of the present invention to provide a low moisture active dry yeast with improved initial leavening activity. It is a further object of the present invention to provide an active dry yeast which may be rehydrated in cool water without substantial reduction of its leavening ability. A still further object of the present invention is to provide a dry yeast with a high degree of storage stability.

We have found that the above objects may be accomplished by incorporating into yeast, prior to drying the yeast, a small amount of a glyceryl diester wherein one of the ester groups is derived from a saturated fatty acid having a chain length of more than 12 carbon atoms and the other ester group contains at least one available acid group. The available acid group may be a free acid group, i.e., in hydrogen form, or a salt of an acid. It is preferred that the saturated fatty acid chain contain from 14 to 18 carbon atoms.

Examples of glyceryl diesters which we found to be preferable are diacetyl tartaric acid ester of fully hydrogenated vegetable oil (soybean) monoglyceride manufactured by Hachmeister Incorporated and sold under the tradename "TEM4H," succinylated monoglycerides of saturated fatty acids having carbon chain lengths in the range of 13 to 21 manufactured by National Dairy Products Corporation and identified by tradename "SMG," sodium phosphated glyceryl monostearate manufactured by Witco Chemical Company Incorporated and sold under the tradename "Emcol D70–31," stearyl monoglyceridyl citrate manufactured by Chas. Phizer and Co., Inc. and identified by the tradename "Sequol 140," and a composition consisting of

| | Percent |
|---|---|
| Mono- and diglycerides of palmitic and stearic acids | 32–35 |
| Sodium sulfoacetates thereof (calculated as $R \cdot CO \cdot OCH_2 \cdot CH_2OH \cdot CH_2O \cdot OC \cdot CH_2SO_3No$) | 10–13 |
| Sodium chloride | 3 |
| Water | 50–52 | manufactured by Witco Chemical Company Incorporated and sold under the tradename "Emargol."

The diesters may be introduced into the yeast at any point prior to drying the yeast provided they are substantially uniformly distributed in the final dried yeast. It is convenient to form a fine suspension or emulsion of the diester in a suitable solvent, heat the suspension or emulsion with stirring until the diester is substantially dissolved and then mix the solution directly with cream or compressed yeast.

The amount of diester, based on the weight of the final active dry yeast product, may vary over a relatively wide range. Beneficial results have been obtained with a fraction of one percent by weight. However, the preferred amount varies between about 1 and about 3 percent by weight. Larger amounts may be added but they do not appear to confer any additional benefit.

A further embodiment of the invention is the provision of an antioxidant in the active dry yeast product of the present invention. Examples of suitable antioxidants are butylated hydroxyanisole and butylated hydroxytoluene. These antioxidants stabilize the dry yeast product so that it may be stored under atmospheric conditions without incurring substantial loss of its leavening activity. Very small amounts of the antioxidant are sufficient, for instance, about 0.025 to about 0.5 percent based on the weight of the yeast solids. Larger amounts may be used but they do not appear to confer any additional benefit. The greatest benefit seems to be obtained with amounts between about 0.1 and about 0.2 percent.

The antioxidant may be incorporated in the moist yeast at any stage prior to drying the yeast. It is convenient to add the antioxidant in solution in an edible carrier. Exemplary of edible carriers we prefer to use are vegetable oils which are liquid at room temperatures for instance, peanut oil, soybean oil, corn oil, cotton seed oil, sunflower oil and safflower oil. However, edible carriers which are solid at room temperature may be used by simply heating the carrier above its melting point before admixing with the antioxidant and maintaining this temperature while the solution is being incorporated into the yeast. Synthetic edible carriers may also be used, for instance, propylene glycol.

The moisture content of the active dry yeast of the present invention should be below about 7.5 percent by weight and preferably between about 4 and about 7 percent by weight.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout the specification, percentages are intended to refer to percent by weight unless otherwise specified.

EXAMPLE I

This example illustrates the preparation of an active dry yeast of the present invention and its superiority over a control sample as measured by initial and leavening activity after storage.

320 gm. of diacetyl tartaric acid ester of fully hydrogenated vegetable oil (soybean) monoglyceride (TEM4H) were suspended in 4 liters of water and the suspension slowly heated with stirring to a temperature of 190° F. This solution was cooled to 100° F., and 248 grams of it were added to 4 kg. of cream yeast containing 22.9 percent yeast solids.

18.4 gm. of sodium phosphated glyceryl monostearate (Emcol D70–31) were suspended in 230 grams of water and slowly heated with stirring to a temperature of 170° F. The suspension was cooled to about 100° F. and added to 4 kg. of cream yeast containing 22.9 percent yeast solids.

A yeast press cake was prepared from these suspensions by vacuum filtration and pressing and the cake was extruded into spaghetti form and dried in a temperature range from 95° to 120° F. and at a relative humidity of from about 70 to about 10 percent until the product reached the desired moisture content. Portions of the yeast samples were used in preparing a sweet dough to check their initial leavening activity and other portions of the samples were stored at 115° F. in nitrogen for 7 days and then checked for leavening activity. Leavening activity is defined as follows:

Fermentation time

The time required for a given weight of sweet dough, maintained at 86° F., to rise to a predetermined volume.

Proof time

The time required for the dough to reach this volume at the same temperature after being punched down.

The results of these tests are given in Table I.

TABLE I

| Additive | Percent moisture | Initial activity | | Activity after storage | |
|---|---|---|---|---|---|
| | | Fermentation time | Proof time | Fermentation time | Proof time |
| None (control) | 7.8 | 88 | 63 | 157 | 131 |
| Do | 4.7 | 153 | 106 | 152 | 141 |
| 2% TEM4H | 4.8 | 93 | 69 | 108 | 82 |
| 2% Emcol D70-31 | 4.7 | 85 | 67 | 107 | 82 |

EXAMPLE II

The example illustrates the preparation of active dry yeast products of the present invention and compares their leavening activity after being rehydrated both in water at 100° F. and 70° C. with the leavening activity of control samples.

2.1 gm. of diacetyl tartaric acid ester of fully hydrogenated soybean oil monoglyceride (TEM4H) were suspended in 20 ml. of water and heated to 190° F. and homogenized in a Waring Blender. The suspension was then cooled to 100° F., added slowly to 600 gm. of a wet yeast press cake containing 35 percent yeast solids and thoroughly mixed. This yeast was then sprayed with 1.68 gm. of a BHA-peanut oil solution containing 0.21 gm. BHA and thoroughly mixed. The yeast was then extruded and dried in the manner described in Example I.

18.08 gm. of sodium phosphated glyceryl monostearate (Emcol D70–31) were suspended in 226 ml. of water, heated to 170° F. with stirring and cooled to 95° F. This suspension was then added slowly to 4 kg. of cream yeast containing 22.4 percent yeast solids and thoroughly mixed. The yeast was separated from the suspension as a press cake by vacuum filtration and pressing. 335 gm. of the press cake and 0.95 gm. of a BHA-peanut oil solution containing 0.113 gm. BHA were thoroughly mixed. The yeast was then extruded and dried as described in Example I.

10 gm. of "SMG" were suspended in 90 ml. of a 0.005% NaOH solution and heated to 190° F. with stirring. The suspension was then cooled to ambient temperature. 21 gm. of this suspension and 600 gm. of compressed yeast containing 35 percent solids were thoroughly mixed for 10 minutes. 1.68 gm. of a BHA-peanut oil solution containing 0.21 gm. of BHA was sprayed onto the yeast over a period of about 5 minutes while the yeast was being mixed. This yeast was then extruded and dried in the manner described above.

50 gm. of "Sequol 140" were suspended in 450 ml. of a 1% NaOH solution and the suspension heated to 150° F. The suspension was then cooled to 90° F. 21.0 gm. of the suspension and 600 gm. of compressed yeast containing 35 percent yeast solids were mixed for 10 minutes. The yeast, while being mixed, was then sprayed over a period of about 5 minutes with 1.81 gm. of a BHA-peanut oil solution containing 0.23 gm. BHA. This treated yeast was extruded and dried in the manner described above.

40.0 gm. of "Emargol" were suspended in 160 ml. of water, heated to 150° F. and cooled to ambient temperature. 21 gm. of this suspension was incorporated into 600 gm. of compressed yeast containing 35 percent solids while mixing for 6 minutes. The yeast was then sprayed with 1.75 gm. of a BHA-peanut oil solution containing 0.22 gm. BHA and mixed for 5 minutes. This treated yeast was extruded and dried in the manner described above.

Portions of the products were rehydrated in water at 100° F. and 70° F. and checked for leavening activity in sweet dough. The results of the tests are given in Table II. These results show that even though the yeast products of the present invention were dried to moisture levels below 8 percent and in one case to a moisture level of 4.5 percent their leavening activity after being rehydrated in water at both 100 and 70° F. was comparable to the leavening activity of the control samples having moisture levels of about 8 percent.

EXAMPLE III

This example illustrates the preparation of active dry yeast containing glyceryl esters which do not have an available acid group and shows that such yeast possesses very poor water tolerance.

40 gm. of glyceryl monostearate were suspended in 500 ml. of water and the suspension heated to 151° F. with stirring. The suspension was then cooled to 100° F., added slowly to 10.2 kg. of cream yeast containing 19.6% solids and thoroughly mixed. The yeast was separated from the suspension by vacuum filtration and pressing and the press cake was diluted with a small amount of water to achieve a solids content of 32 percent. The yeast was then extruded and dried in the same manner described in Example I.

40 gm. of glyceryl lacto palmitate were suspended in 500 ml. of water containing 4 gm. NaOH and the suspension heated to 180° F. with mixing. The suspension was then cooled to ambient temperature and 28 gm. of it were mixed thoroughly with 600 gm. of compressed yeast containing 35 percent solids. Then the yeast was mixed for 5 minutes with 1.68 gm. of BHA-peanut oil solution containing 0.21 gm. BHA. The yeast was then extruded and dried in the manner described in Example I.

The leavening activity of these products was determined in the manner described in Example II after rehydration at both 70° F. and 100° F. The results are given in Table II.

TABLE II

| Additive | Percent H₂O | Leavening activity of the dried yeast | | | |
|---|---|---|---|---|---|
| | | Rehydrated at 100° F. | | Rehydrated at 70° F. | |
| | | Fermentation time | Proof time | Fermentation time | Proof time |
| Glyceryl esters of the present invention: | | | | | |
| Control | 8.1 | 88 | 69 | 106 | 86 |
| 1% TEM4H [1] | 6.4 | 86 | 67 | 94 | 72 |
| Control | 8.0 | 81 | 62 | 96 | 78 |
| 2% Emcol D70-31 [1] | 4.5 | 86 | 68 | 98 | 74 |
| Control | 8.1 | 83 | 66 | 107 | 81 |
| 1% SMG [1] | 6.6 | 92 | 73 | 115 | 87 |
| Control | 8.0 | 84 | 72 | 111 | 93 |
| 1% Sequol 140 [1] | 6.9 | 92 | 72 | 106 | 84 |
| 2% Emargol [1] | 6.6 | 92 | 68 | 103 | 79 |
| Glyceryl esters not having free acid groups: | | | | | |
| Control | 8.3 | 85 | 66 | 104 | 78 |
| 1% lactated monoglyceride [1] | 6.8 | 100 | 75 | 159 | 112 |
| Control | 7.9 | 84 | 68 | 113 | 98 |
| 2% glyceryl monostearate | 6.6 | 93 | 73 | 147 | 119 |
| Glyceryl esters having an unsaturated fatty acid chain: | | | | | |
| Control | 8.3 | 85 | 66 | 104 | 78 |
| 1% acetylated tartrated monoglyceride [1] | 6.6 | 117 | 88 | 248 | ([2]) |

[1] These samples also contained 0.1% BHA and 0.7 peanut oil.
[2] Very slow.

EXAMPLE IV

This example illustrates the preparation of active dry yeast containing a glyceryl ester having an available acid group but no saturated fatty acid radical. The example shows that such yeast possesses very poor cool water tolerance.

100 gm. of diacetyl tartaric ester of cotton seed oil monoglyceride were suspended in 925 ml. of a water and the suspension heated to 190° F. The hot suspension was passed through a colloid mill. The suspension was then cooled to ambient temperature and 20.9 gm. of this suspension was thoroughly mixed with 600 gm. of compressed yeast containing 35 percent yeast solids. The yeast was then sprayed with 1.68 gm. of a BHA-peanut oil solution containing 0.21 gm. BHA while being mixed. The yeast was then extruded and dried in the manner described above.

The leavening activity of this product was determined in the manner described in Example II after rehydration at both 70° F. and 100° F. The results are given in Table II.

EXAMPLE V

This example illustrates the high degree of storage stability of the active dry yeasts of the present invention. The yeast samples were prepared according to Example II and then stored for either 4 or 7 days at 115° F. in an oxygen containing atmosphere. After storage the samples were rehydrated in water at 100° F. and then tested for leavening activity in a sweet dough formula. The results are shown in Table III.

TABLE III

| Additive | Percent moisture | Leavening activity after storage at 115° F. in an oxygen containing atmosphere | |
|---|---|---|---|
| | | Fermentation time | Proof time |
| Control [1] | 8.1 | 119 | 100 |
| 1% TEM4H +0.1% BHA [1] | 6.4 | 100 | 88 |
| Control [2] | 8.0 | 169 | 155 |
| 2% Emcol D70-31 +0.1% BHA [2] | 4.5 | 108 | 87 |
| Control [1] | 8.1 | 122 | 105 |
| 1% SMG [1] | 6.6 | 113 | 94 |
| Control [1] | 8.0 | 132 | 118 |
| 1% Sequol 140 +0.1% BHA [1] | 6.9 | 110 | 92 |
| 2% Emargol +0.1% BHA [1] | 6.6 | 111 | 97 |

[1] Stored for four (4) days.
[2] Stored for seven (7) days.

What is claimed is:

1. An active dry yeast comprising yeast having a moisture content below about 7.5% by weight and a small but effective amount of a glyceryl diester wherein one of the ester groups is derived from a saturated fatty acid having a carbon chain length greater than 12 and the other ester group contains at least one available acid group, which ester imparts to said yeast superior leavening activity.

2. An active dry yeast as defined in claim 1, wherein the moisture content is from about 4 to about 7 percent by weight.

3. An active dry least as defined in claim 1, wherein the acid group is a tartaric acid group.

4. An active dry yeast as defined in claim 2, wherein the diester is a diacetyl tartaric acid ester of fully hydrogenated vegetable oil monoglyceride.

5. An active dry yeast as defined in claim 1, wherein the acid group is a phosphoric acid group.

6. An active dry yeast as defined in claim 2, wherein the diester is sodium phosphated glyceryl monostearate.

7. An active dry yeast as defined in claim 1, wherein the acid group is a citric acid group.

8. An active dry yeast as defined in claim 2, wherein the diester is stearyl monoglyceridyl citrate.

9. An active dry yeast as defined in claim 1, wherein the acid group is a sulfoacetic acid group.

10. An active dry yeast as defined in claim 2, wherein the diester comprises a mixture of sodium sulfoacetated monoglyceride of stearic acid and sodium sulfoacetated monoglyceride of palmitic acid.

11. An active dry yeast as defined in claim 1, wherein the acid group is a succinic acid group.

12. An active dry yeast as defined in claim 2, wherein the diester is a mixture of succinylated monoglycerides of saturated fatty acids having carbon chain lengths in the range of 13 to 21.

13. An active dry yeast as defined in claim 1, containing a small amount of an antioxidant effective to impart substantial storage stability in air to the yeast.

14. An active dry yeast as defined in claim 13, wherein the antioxidant is butylated hydroxyanisole or butylated hydroxytoluene.

15. An active dry yeast as defined in claim 2, wherein one of the ester groups is derived from a saturated fatty acid having a carbon chain length from 14 to 18 carbon atoms.

16. An active dry yeast as defined in claim 2, wherein the amount of diester present is from about 1 to about 3 percent by weight.

References Cited

UNITED STATES PATENTS 2,919,194  12/1959  Johnston _____ 99—96
3,041,249  6/1962  Chen et al. _____ 195—98 X LIONEL M. SHAPIRO, Primary Examiner.

D. M. NAFF, Assistant Examiner.

U.S. Cl. X.R.

195—74, 98